United States Patent
Jurski et al.

(10) Patent No.: US 12,013,806 B2
(45) Date of Patent: Jun. 18, 2024

(54) I3C PENDING READ WITH RETRANSMISSION

(71) Applicant: Intel Corporation, Santa Clara, CA (US)

(72) Inventors: Janusz Jurski, Beaverton, OR (US); Enrico David Carrieri, Placerville, CA (US); Amit Kumar Srivastava, Folsom, CA (US); Matthew A. Schnoor, Hillsboro, OR (US); Myron Loewen, Berthoud, CO (US)

(73) Assignee: Intel Corporation, Santa Clara, CA (US)

(*) Notice: Subject to any disclaimer, the term of this patent is extended or adjusted under 35 U.S.C. 154(b) by 537 days.

(21) Appl. No.: 17/128,384

(22) Filed: Dec. 21, 2020

(65) Prior Publication Data

US 2021/0109887 A1    Apr. 15, 2021

Related U.S. Application Data

(60) Provisional application No. 63/067,578, filed on Aug. 19, 2020.

(51) Int. Cl.
| | | |
|---|---|---|
| G06F 13/42 | (2006.01) | |
| G06F 9/54 | (2006.01) | |
| G06F 13/24 | (2006.01) | |
| G06F 13/362 | (2006.01) | |

(52) U.S. Cl.
CPC .......... *G06F 13/4291* (2013.01); *G06F 9/542* (2013.01); *G06F 13/24* (2013.01); *G06F 13/362* (2013.01)

(58) Field of Classification Search
None
See application file for complete search history.

(56) References Cited

U.S. PATENT DOCUMENTS

| | | | |
|---|---|---|---|
| 6,282,572 B1 | 8/2001 | Dahlin et al. | |
| 7,089,369 B2 | 8/2006 | Emberling | |
| 10,331,612 B1* | 6/2019 | Petkov | G06F 13/4221 |

(Continued)

FOREIGN PATENT DOCUMENTS

WO    2017189206 A1    11/2017

OTHER PUBLICATIONS

MIPI Alliance, Specification for I3C Basic, Version 1.1.1, Jun. 9, 2021, Section 5.1.6.2.2, pp. 86-87.

(Continued)

*Primary Examiner* — Scott C Sun
(74) *Attorney, Agent, or Firm* — Trop, Pruner & Hu, P.C.

(57) ABSTRACT

Embodiments of the present disclosure may relate to apparatus, process, or techniques in a I3C protocol environment that include identifying a pending read notification message by a slave device to be sent to a master device to indicate that the data is available to be read by the master device from a buffer associated with the slave device. The pending read notification may be subsequently transmitted to the master device. Subsequently, until the data in the buffer has been read by the master device, the slave device may wait an identified amount of time that is less than a value of a timeout of the master device, and retransmit the pending read notification message to the master device. Other embodiments may be described and/or claimed.

17 Claims, 7 Drawing Sheets

(56) References Cited

U.S. PATENT DOCUMENTS

| | | |
|---|---|---|
| 2013/0024864 A1 | 1/2013 | Nukala |
| 2014/0129749 A1 | 5/2014 | Bass et al. |
| 2014/0321700 A1 | 10/2014 | Zhan |
| 2016/0364353 A1 | 12/2016 | Sengoku |
| 2018/0181507 A1 | 6/2018 | Foust et al. |
| 2018/0293196 A1 | 10/2018 | Srivastava et al. |
| 2019/0108149 A1 | 4/2019 | Graif et al. |
| 2019/0121765 A1 | 4/2019 | Srivastava et al. |
| 2021/0103387 A1* | 4/2021 | Vanninen ............... G06F 3/061 |
| 2021/0109887 A1 | 4/2021 | Jurski et al. |

OTHER PUBLICATIONS

Great Britian Patent Office, Combined Search and Examination Report dated Dec. 14, 2021, in Great Brittan Patent Application No. 2111093.7, 7 pages.

Mipi Alliance, Inc., "Errata 01 for MIPI I3C Specification Improved Inter Integrated Circuit Specification Version 1.1," Nov. 2019, 494 pages.

Patent Cooperation Treaty, International Search Report and Written Opinion dated Nov. 5, 2021 in PCT Application No. PCT/US2021/042715 (13 pages).

Netherlands Patent Office, Office Action dated Mar. 29, 2022 in Neterlands Patent Application No. 2028891 (9 pages).

\* cited by examiner

700

Non-transitory computer-readable storage medium 702
as may be implemented in embodiments of FIG. 4.

Programming instructions 704
to cause a digital content consumption device, in response to execution of the instructions by a processor of the digital content consumption device, to practice aspects of embodiments of portions of the processes described with respect to FIG. 3.

FIG. 7

I3C PENDING READ WITH RETRANSMISSION

This application claims priority to U.S. Provisional Patent Application No. 63/067,578, filed on Aug. 19, 2020, in the names of Janusz Jurski; Enrico David Carrieri; Amit Kumar Srivastava; Matthew Schnoor; and Myron Loewen, entitled "I3C Pending Read With Retransmission," the disclosure of which is hereby incorporated by reference.

TECHNICAL FIELD

Embodiments of the present disclosure generally relate to the field device interconnects, in particular to communications between master and slave devices using the Improved Inter Integrated Circuit (I3C) specification and protocol.

BACKGROUND

The I3C protocol, which is maintained via the MIPI® Alliance, is suitable for a broad range of device interconnect applications that include, for example, communications between sensor and memory interfaces.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 7 depicts a computer-readable storage medium that may be used in conjunction with a computing device, in accordance with various embodiments.

DETAILED DESCRIPTION

Figure 1:
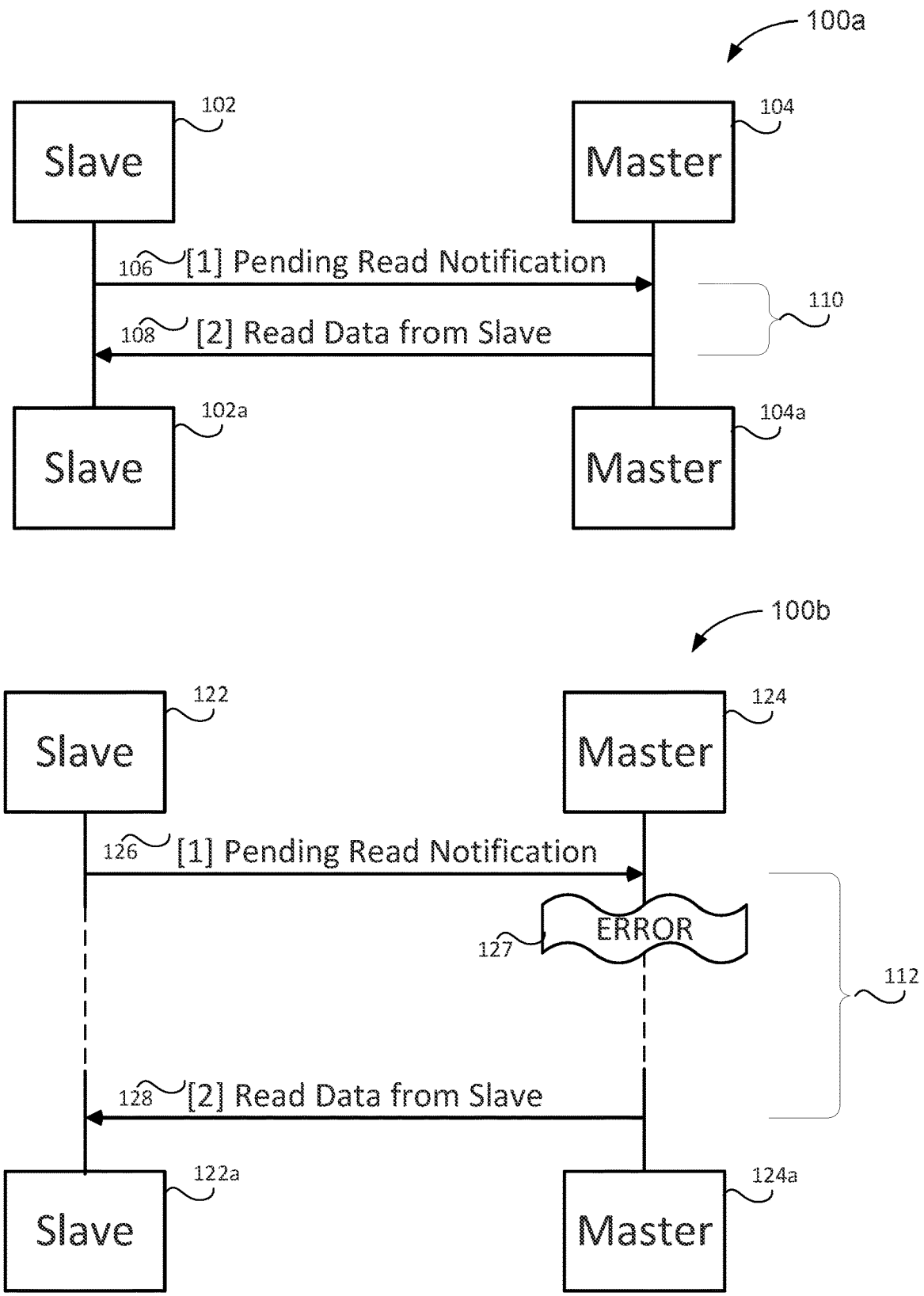
FIG. 1 illustrates I3C communication sequences between a slave and a master device with and without read notification errors, in accordance with various embodiments.

Embodiments described herein may be directed to apparatus, process, or techniques in a I3C protocol environment that include identifying a pending read notification, which may also be referred to as a pending read notification message, by a slave device to be sent to a master device to indicate that the data is available to be read by the master device from a buffer associated with the slave device. The pending read notification may be subsequently transmitted to the master device. Subsequently, until the data in the buffer has been read by the master device, the slave device may wait an identified amount of time that is less than a value of a timeout of the master device, and retransmit a pending read notification message to the master device. in embodiments, the retransmission may occur until the buffer of the slave device is empty.

In legacy implementations of the I3C 1.1 protocol revision, a mechanism referred to as "pending read notification" is identified where a I3C slave device informs the I3C master that the slave device has data to be read by the master. Once informed, the master then reads the data. However, there are various scenarios, for example a bus communication error, where pending read notifications are lost. This may lead to data sitting in the I3C slave device buffer for an extended period, which will significantly impact a bus performance. For example, loss in bus performance may be due to the master no receiving a valid pending read notification and does not know it may perform the read. This time, and thus performance, is lost because the master is waiting longer than it needs to. The master may either wait indefinitely or wait for a timeout indicating that the master has to retry the message exchange (e.g. send a write transfer to get a read transfer). Or, the master will just retry the read without knowing whether the read will work. In these legacy I3C implementations that include the "pending read notification" protocol, an I3C master may only attempt to read data from the slave upon notification from the slave.

In legacy implementations, the I3C specified bus may have or may involve dissipation of electrical energy, or may be susceptible to outside electromagnetic interference, which may corrupt data on the bus. This may also be referred to as the bus being "lossy." The legacy I3C specification does not have error correction, flow control, or specified recovery mechanisms to deal with corrupted or lost data transferred over the bus. Although there is a mechanism to wait for the master to timeout on a dropped data ready notifications in the I3C specification, this mechanism is not very efficient because resources remain consumed while time prior to the master timeout is wasted. As a result, in these legacy implementations, subsequent messages will be delayed to or from the same slave, and busy resources from the master may prevent initiating traffic to other slaves.

Embodiments described herein may be directed to a mechanism where the I3C slave device with pending read data will periodically notify the master device on the bus until the pending read data of the slave is read. In embodiments, the frequency of the period may be optimized for shorter periods when the bus is idle, or may be made longer if other traffic on the bus is detected. In other embodiments, the notification of pending read data may be immediate if additional data is appended to pending read data queue of the slave.

Embodiments described herein may provide a more robust data transfer mechanism on the I3C bus that will also improve bus throughput performance. In particular, waiting time to retrieve the data from the slave data queue is shortened where there are frequent communication bit errors, for example in electrically noisy environments or when using long cables. In legacy implementations, the master timeout may be in the range of 100 ms, because a slave device on the bus may take a long time to respond. The slave, however, could repeat a pending read notification to a master device as often as every 200 µs when the bus is idle. Because there is no communications overhead for correctly received transmissions, there is no downside or minimum bit error rate before this feature is beneficial.

In addition, in embodiments, the master device may avoid unnecessary read attempts. If either the notification message or the address bits in the read transaction experience a bit error, then the master may read the buffer of the wrong slave device. Once the read is complete the master could detect from the content that the response was from the wrong slave. In these embodiments, the master just waits for the repeated notification from the correct slave instead of having to read all potentially active slaves to find the correct slave with pending content. In embodiments, the master may avoid unnecessary read attempts and avoid using any timeouts, saving implementation complexity.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 illustrates I3C communication sequences between a slave and a master device with and without read notification errors, in accordance with various embodiments. Diagram 100a shows a communications sequence between a slave 102 and a master 104 that are communicatively coupled by a I3C bus (not shown). There may be other slave devices 102a and master devices 104a coupled to the I3C bus (not shown). The slave 102 issues a pending read notification message 106 to the master 104 to indicate data exists in a queue associated with the slave 102 to be read by the master 104. The master 104 receives the pending read notification message 106 and initiates a data read from the slave 108. In this example, the pending read notification 106 is received by the master 104 intact, e.g. there have been no errors introduced into the pending read notification 106 message during communication. In this example, the master 104 may respond quickly, for example within the response time 110, to the pending read notification 106 by initiating a read data from the slave 108. In this example, the response time 110 may be significantly shorter than a timeout time of the master 104.

Diagram 100b shows a communications sequence between a slave 122 and a master 124 that are communicatively coupled by a I3C bus (not shown). The slave 122 issues a pending read notification message 126 to the master 124 to indicate data exists in a queue of the slave 122 to be read by the master 124. In this example, an error 127 occurs that causes the master 124 to either not receive the pending read notification 126, or to receive a corrupted pending read notification 126. The corrupted pending read notification 126 may include scenarios like bit errors in the read notification, or where the notification is lost. In such a case, the slave 122 will not send new data unless the master 124 reads it spontaneously. For example, the master 124 may implement a timeout and take action if there is no slave 122 response before a timeout time 112 expires. Relying on spontaneous reads of the slave 122 by the master 124 is not very efficient and may take a long time because the timeout time 112 may be set to be large enough for the slowest expected response from any slave 122, 122a. For example, the timeout time 112 may be set to 100 ms as discussed in the management component transport protocol (MCTP) base specification. In embodiments, the timeout time 112 may be much larger, e.g. orders of magnitude larger than the response time 110.

Further with respect to diagram 100b, if the error 127 corrupts the pending read notification 126 read by the master 124, this may result in the master 124 attempting to read data from an incorrect slave 122a that is also coupled to the I3C bus (not shown). In other examples, the message may be discarded or may be mistaken as some other operation. In this case, the data to be read in the queue of the slave 122 will stay there indefinitely, or until some other timeout has occurred.

Figure 2:
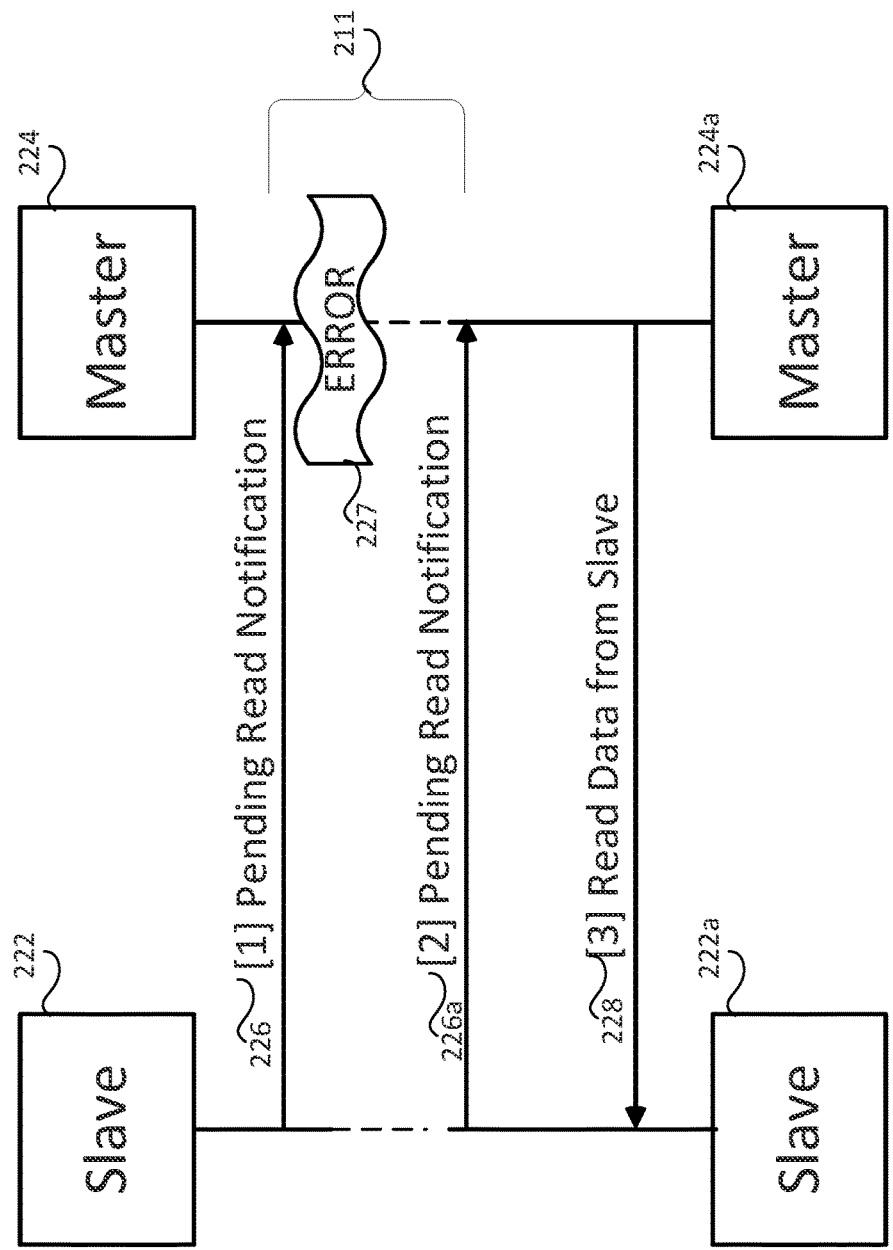
FIG. 2 illustrates I3C communications with pending read notification retransmission, in accordance with various embodiments.

FIG. 2 illustrates I3C communications with pending read notification retransmission, in accordance with various embodiments. Slave 222 and master 224, which may be similar to slave 122 and master 124 of FIG. 1, maybe communicatively coupled by an I3C bus (not shown). Additional slave 222a and master 224a devices may also be communicatively coupled to the I3C bus. The slave 222 issues a pending read notification message 226 to the master 224 to indicate data exists in a queue of the slave 222 to be read by the master 224. In this example, an error 227 occurs that causes the master 224 to either not receive the pending read notification 226, or to receive a corrupted pending read notification 226 as discussed above.

In embodiments, the slave 222 will continue to retransmit a pending read notification 226*a* periodically until the master 224 is initiated a read data from slave 228. In particular, the retransmission time of the pending read notification 226*a* may occur at a time interval 211, which may be substantially shorter than the master 124 timeout time 112. In embodiments, the time interval 211 may be defined when the I3C bus is not busy (for example, is idle) and there is data in an output queue of the slave 222. In embodiments, time interval 211 may occur as quickly as the I3C bus idle time of 200 μs.

In embodiments, it may be possible that retransmissions of the pending read notification 226*a* may result in a race condition in the master 224 processing the repeated notification after a read data from slave 228 is complete. Such a race condition may happen only if the processing of data by the master device 224 is relatively slow, for example greater than character time on the bus, typically through software handling. If such a race condition occurs, the master 224 may attempt another data read from slave 228, and determine that the slave 222 buffer is empty. If this occurs, the legacy I3C protocol has a mechanism to indicate an empty slave buffer to the master.

In other embodiments, the transmitted pending read notification 226 and retransmitted pending read notification 226*a* may be tagged with a data value that indicates whether the notification is a new versus a repeated pending read notification. In embodiments, other bits within the tag may indicate how much data is waiting in the slave 222 read queue, or if there were errors detected. The slave 222 itself may detect an error on the bus through monitoring the bus, for example to determine whether the transmitted data differs from what was intended to be transmitted. For example, when Management Component Transport Protocol (MCTP) packets are transferred over an I3C bus, the tag accompanying the notification may be equal to the "TAG" field in the packet that specifies that the packet is specific to the MCTP. This allows the master 224 to detect a valid or a non-valid MCTP packet, and to detect a match or a mismatch. These example embodiments may improve the efficiency of communication on the lossy I3C bus.

In other embodiments, the master 224 may read data from the slave 222 for some reason other than receiving a pending read notification 226. This may happen after the error 227, but before the transmitted pending read notification. In this example, the read by the master 224 would clear the timeout for a retransmission of the pending read notification from the slave 222, because the master 224 received the data for which the pending read notification signaled.

Figure 3:
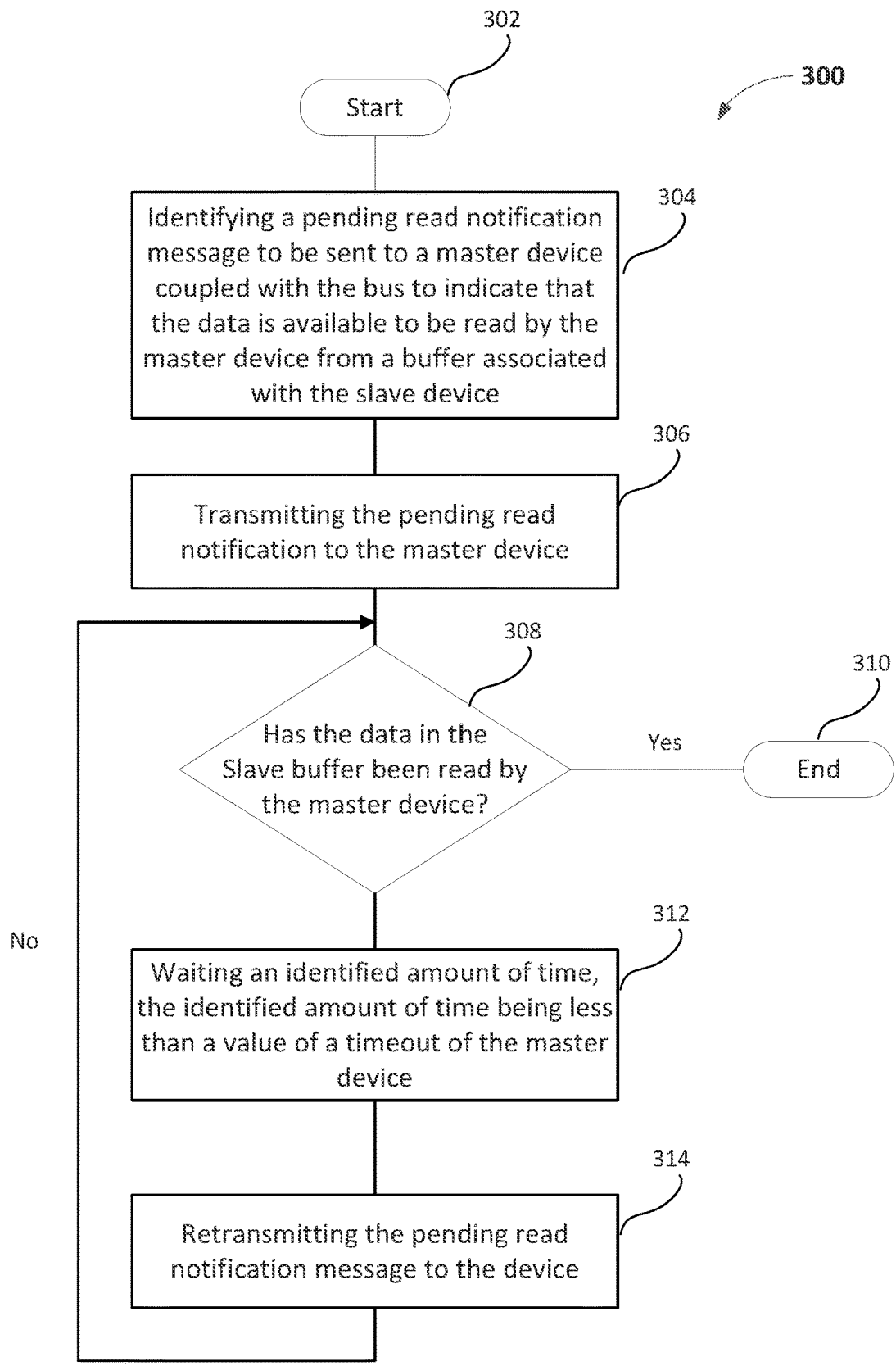
FIG. 3 shows an example process for implementing pending read notification retransmission in a slave device, in accordance with various embodiments.

FIG. 3 shows an example process for implementing pending read notification retransmission in a slave device, in accordance with various embodiments. Process 300 may be implemented using the components, techniques, and processes described herein, in particular with respect to FIGS. 1-3. Process 300 may be a process to implement a slave device, such as slave 222 of FIG. 2. Process 300 may be implemented as part of a slave operation module 418 of FIG. 4.

At block 302, the process may start.

At block 304, the process may include identifying a pending read notification message to be sent to a master device coupled with the bus to indicate that the data is available to be read by the master device from a buffer associated with the slave device. In embodiments, the pending read notification message may be similar to pending read notification 226 of FIG. 2, and the master device may be similar to master device 224 of FIG. 2.

At block 306, the process may further include transmitting the pending read notification to the master device. In embodiments, the transmission occurs over an I3C bus that communicatively couples the slave 222 with the master 224. In embodiments, the transmission may occur as an in band interrupt (IBI).

At block 308, the process may further include a determination of whether the data in the slave buffer has been read by the master device. If the data in the buffer of the slave has been read by the master device, then the process may end at block 310.

Otherwise, at block 312, the process may further include waiting and identified amount of time, the identified amount of time being less than a value of a timeout of the master device. In embodiments, the identified amount of time may be similar to the timeout time 211 of FIG. 2.

At block 314, the process may further include retransmitting the pending read notification message to the master device. The process may then return to block 308.

Other embodiments may include a process to implement a master device, such as master device 224, using the components, techniques, and processes described herein. In embodiments, such a process may be implemented by the master operation module 419 of FIG. 4.

Figure 4:
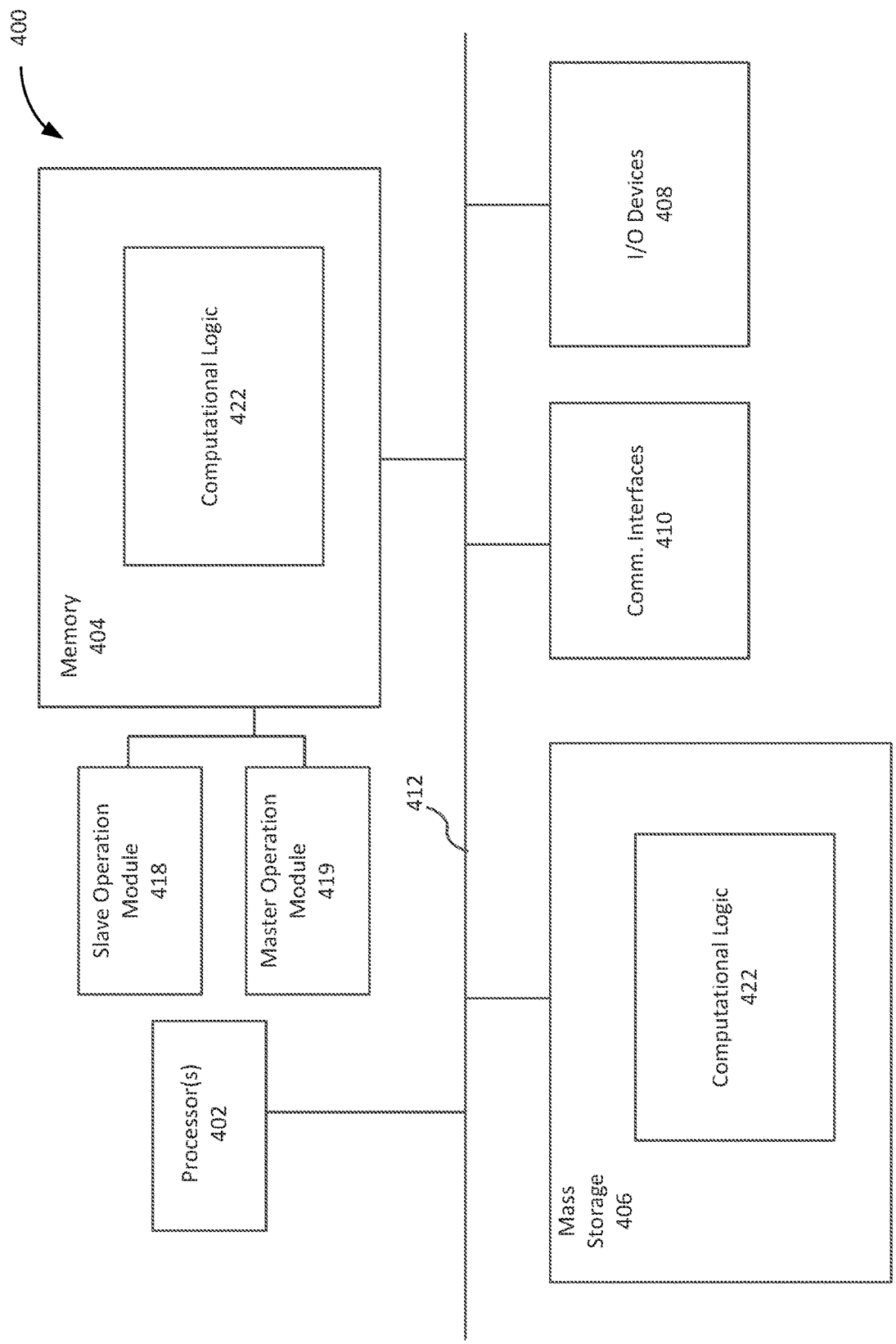
FIG. 4 illustrates an example computing device 400 suitable for use with various components of FIGS. 1-3, in accordance with various embodiments.

FIG. 4 illustrates an example computing device 400 suitable for use with various components of FIGS. 1-3, in accordance with various embodiments. As shown, computing device 400 may include one or more processors or processor cores 402 and system memory 404. For the purpose of this application, including the claims, the terms "processor" and "processor cores" may be considered synonymous, unless the context clearly requires otherwise. The processor 402 may include any type of processors, a microprocessor, and the like. The processor 402 may be implemented as an integrated circuit having multi-cores, e.g., a multi-core microprocessor.

The computing device 400 may include mass storage devices 406 (such as diskette, hard drive, volatile memory (e.g., dynamic random-access memory (DRAM), compact disc read-only memory (CD-ROM), digital versatile disk (DVD), and so forth). In general, system memory 404 and/or mass storage devices 406 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 400 may further include I/O devices 408 (such as a display (e.g., a touchscreen display)), keyboard, cursor control, remote control, gaming controller, image capture device, a camera, one or more sensors, and so forth) and communication interfaces 410 (such as network interface cards, serial buses, modems, infrared receivers, radio receivers (e.g., Bluetooth), and so forth).

The communication interfaces 410 may include communication chips (not shown) that may be configured to operate the device 400 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond.

The above-described computing device 400 elements may be coupled to each other via system bus 412, which may represent one or more buses, and which may include, for example, PCIe buses. In other words, all or selected ones of processors 402, memory 404, mass storage 406, communication interfaces 410 and I/O devices 408 may be PCIe devices. In particular, they may be within systems including interconnects incorporated with the teachings of the present disclosure to enable I3C pending read with retransmission, as earlier described. In the case of multiple buses, they may be bridged by one or more bus bridges (not shown). Each of these elements may perform its conventional functions known in the art. In particular, system memory 404 and mass storage devices 406 may be employed to store a working copy and a permanent copy of the programming instructions for the operation of various components of computing device 400, including but not limited to an operating system of computing device 400, one or more applications, and/or system software/firmware in support of practice of the present disclosure, collectively referred to as computing logic 422, having slave operation module 418 and/or a master operation module 419. The various elements may be implemented by assembler instructions supported by processor(s) 402 or high-level languages that may be compiled into such instructions.

The permanent copy of the programming instructions may be placed into mass storage devices 406 in the factory, or in the field through, for example, a distribution medium (not shown), such as a compact disc (CD), or through communication interface 410 (from a distribution server (not shown)). That is, one or more distribution media having an implementation of the agent program may be employed to distribute the agent and to program various computing devices.

The number, capability, and/or capacity of the elements 402, 404, 406, 408, 410, and 412 may vary, depending on whether computing device 400 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, at least one of processors 402 may be packaged together with computational logic 422 configured to practice aspects of embodiments described herein to form a System in Package (SiP) or a System on Chip (SoC).

In various implementations, the computing device 400 may be one or more components of a data center, a laptop, a netbook, a notebook, an ultrabook, a smartphone, a tablet, a personal digital assistant (PDA), an ultra mobile PC, a mobile phone, a digital camera, or an IoT user equipment. In further implementations, the computing device 400 may be any other electronic device that processes data.

Figure 5:
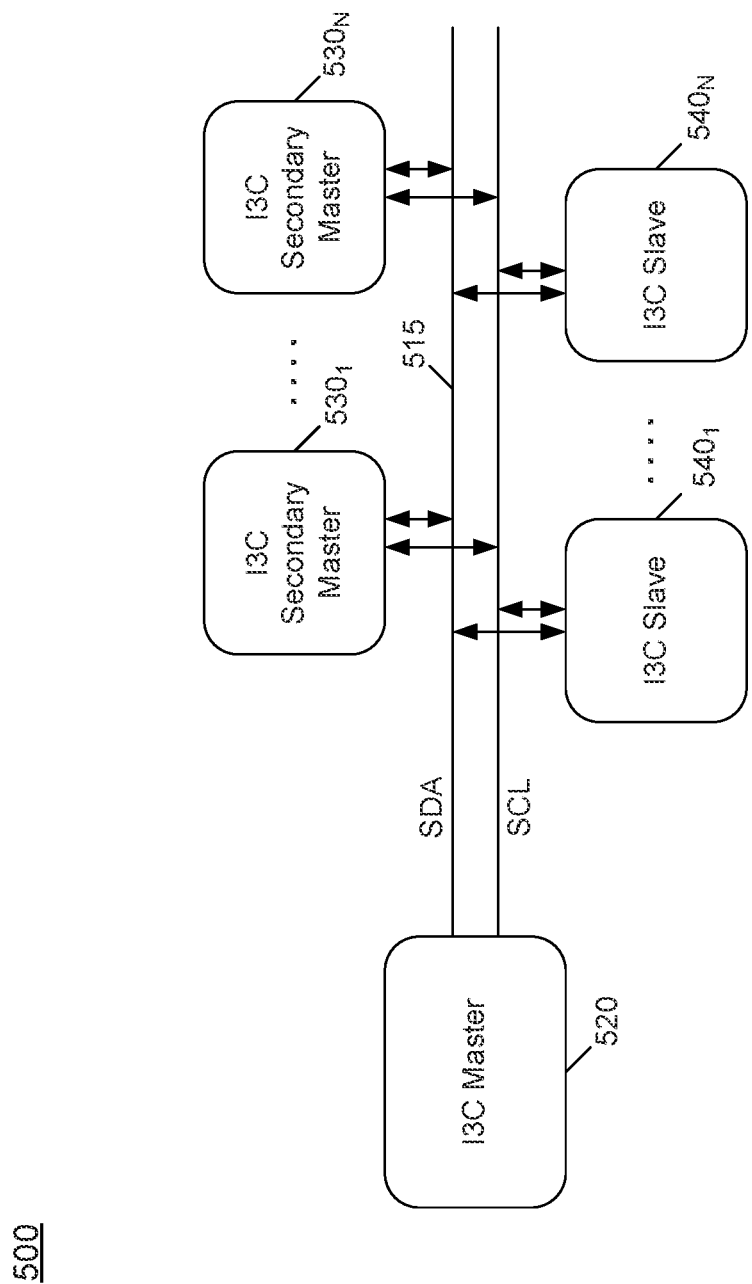
FIG. 5 is a block diagram of a system in accordance with an embodiment.

Referring now to FIG. 5, shown is a block diagram of a system in accordance with an embodiment. More specifically, system 500 shown in FIG. 5 represents at least a portion of any one of a variety of different types of computing devices. In different embodiments, such computing devices can range from relatively small low power devices such as a smartphone, tablet computer, wearable device or so forth, to larger devices such as laptop or desktop computers, server computers, automotive infotainment devices and so forth. In any case, system 500 includes a bus 515. In embodiments herein, bus 515 may be implemented as an I3C bus in accordance with one or more I3C specifications. However, understand the scope of the present invention is not limited in this regard and in other embodiments, bus 515 may be implemented as any type of multi-drop interconnect.

As illustrated, a primary or main master device 520 couples to bus 515. In various embodiments, master device 520 may be implemented as a host controller that includes hardware logic to act as a bus master for bus 515. Master device 520 may include a controller (not shown in the high level view of FIG. 5) to control data (SDA) and clock (SCL). In some cases, master device 520 may be a relatively simple host controller for a low complexity bus or other multi-drop bus, such as in accordance with an $I^2C$ or I3C Specification. Other multi-drop interfaces such as Serial Peripheral Interface and/or Microwire also may be present in a particular embodiment.

In different implementations, master device 520 may be an interface circuit of a multicore processor or other SoC, application processor or so forth. In other cases, master device 520 may be a standalone host controller (such as a given integrated circuit (IC)) or main master device for bus 515. And of course other implementations are possible. In other cases, master device 520 may be implemented as hardware, software, and/or firmware or combinations thereof, such as dedicated hardware logic, e.g., a programmable logic, to perform bus master activities for bus 515.

Note that bus 515 is implemented as a two-wire bus in which a single serial line forms a data interconnect and another single serial line forms a clock interconnect. As such, data communications can occur, e.g., in bidirectional manner and clock communication can occur in a single direction. Master device 520 may be a relatively compute complex device (as compared to other devices on bus 515) that consumes higher power than other devices coupled to bus 515.

As shown in FIG. 5, multiple secondary master devices $530_1$-$530_N$ are present. In various embodiments, secondary master devices 530 (generically) may be implemented as dedicated master or bridge devices such as standalone IC's coupled to bus 515. In other cases, these devices may be independent logic functionality of a SoC or other processor (and in some cases may be implemented in the same IC as master device 520 known as a secondary master). One or more such secondary master devices 530 may be controlled to act as bus master for bus 515 while main master device 520 is in a low power state, to enable bus operations to continue to proceed while in this low power state.

As further illustrated in FIG. 5, a plurality of slave devices $540_1$-$540_N$ also couple to bus 515. In different embodiments, slave devices 540 (generically) may take many different forms. For purposes of example, slave devices 540 may include one or more of an SoC, network interface circuit (NIC), solid state drive (SSD) or other memory such as a dual inline memory module (DIMM), CPU, or other devices such as sensors, peer-to-peer devices, debug devices or so forth. Understand while shown at this high level in the embodiment of FIG. 5, many variations and alternatives are possible.

In embodiments, slave devices that support in-band interrupt (IBI) requests may also implement support for a particular pending read notification contract, by which they may inform a master that there is data to be read for a specific purpose. Such a slave, which expects that the master also supports this contract, may indicate its support by returning a response to a configuration request message. For example, a slave may send a particular value in a message in response to receipt of a capabilities request from the master, which in an embodiment can be sent as a get capabilities (GETCAPS) Format 1 common command code (CCC).

To signal a pending read notification, the slave may send an IBI with a mandatory data byte (MDB) value for which the first three bits (i.e., interrupt group identifier) matches a given value. The remaining five bits in the mandatory data byte value (i.e., the specific interrupt identifier) may be specific for a particular type of slave.

Once the master has accepted the IBI and read the mandatory data byte from the slave, it may signal acceptance of the master's obligation to read the data, as per this contract. The slave can note that the MDB has been read, and make the data available on the next private read request received from the master. However, if the master terminates the IBI before reading the MDB, or if the master NACKs the IBI, then it may not signal acceptance, and the slave may try again at a later time.

Note that the master also may read any additional data bytes as part of the IBI payload, as the slave may add additional bytes such as hint information specific to the type of slave or its function to provide context or further describe or classify the data that the slave will return on the next private read request. If present, the format and length of any additional bytes in the IBI payload may depend on the specific interrupt identifier.

Once the IBI and its MDB have been serviced and accepted, the master may initiate a subsequent private read request to the slave, to read the data which has been made available and ready for this private read request. The master may do this immediately after the IBI has been serviced or at a later time. In an embodiment, the private read request may be done in standard data rate (SDR) mode, or in any supported high data rate (HDR) mode using any HDR read command value specific to that HDR mode. The choice of whether to use an HDR mode may be according to a private contract between the master and the slave, or it may be indicated in the specific interrupt identifier or any additional data bytes in the IBI payload. Once the master has initiated the private read request, it can read the data from the slave, queue it for processing or transfer to its connected host, and retain the association of the data with the IBI notification, including the specific MDB value as well as any additional bytes in the IBI payload.

In an embodiment, a slave may hold only one active pending read notification at any time, while it is waiting for the master to read the data. If the slave is still waiting for the master to initiate a private read request for one pending read notification, then it may not send an IBI with a mandatory data byte value to indicate another pending read notification until after the master has initiated a private read, to consume the data for the first pending read notification. However, the slave may send an IBI with another mandatory data byte value (i.e., one that does not signal a pending read notification) for other reasons, such as reporting error conditions or other types of interrupt events.

If the master has serviced and accepted the IBI and its MDB, but has not initiated the expected private read request in a timely manner, then the slave may re-transmit the IBI with the same MDB (with additional data bytes, as described above) as a reminder such as described above in FIGS. 2 and 3. Note that the master may not initiate multiple private read requests (i.e., one for each additional IBI with MDB for a pending read notification). Instead, the most recent IBI is the notification to consume the data for the active pending read notification. However, if the master does initiate additional private read requests due to additional IBIs as reminders, then the slave will not accept such requests. Note that the slave may keep the data available for the master to satisfy the expected private read request, unless it encounters an error (e.g., due to delayed read or other conditions). If the slave encounters an error or is unable to return the data, then it may not accept the private read request (i.e., the slave NACKs the read), and also may report this situation as an error (such as an IBI with another MDB value).

Figure 6:
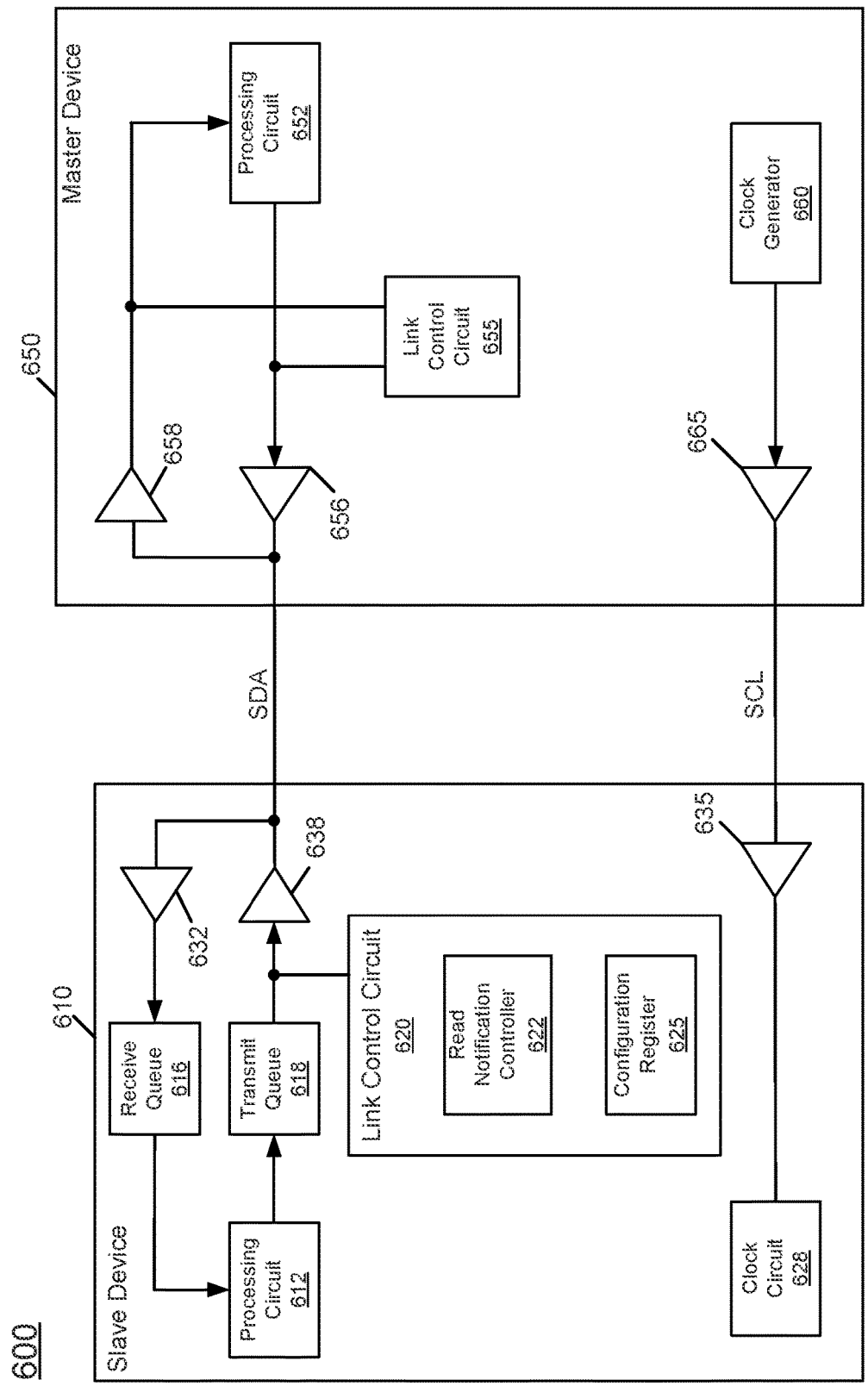
FIG. 6 is a block diagram of a system in accordance with an embodiment.

Referring now FIG. 6, shown is a block diagram of a system in accordance with an embodiment. As shown in the high level view of FIG. 6, system 600 may take the form any type of computing system that includes at least one slave device 610 and at least one master device 650, which are coupled via an I3C bus (implemented with separate clock (SCL) and data (SDA) lines in FIG. 6). More specifically in the high level view of FIG. 6, various details within these devices for handling multiple read notification messages are shown.

With regard to slave device 610, a processing circuit 612, which may be a CPU, GPU, microcontroller, one or more processor cores or other processing or memory circuits, may generate data to be read by master device 650. For a given data unit, the data may be provided for temporary storage in a transmit queue 618, where it may be temporarily stored before it is sent via a driver 638 to master device 650 via the data line.

As further shown, incoming information from master device 650 may be received via the data line in a receiver 632 that in turn couples via a receive queue 616 to processing circuit 612. As further illustrated, an incoming clock signal may be received via the clock line in a receiver 635 that in turn couples to a clock circuit 628. Understand that clock circuit 628 may forward or internally generate one or more clock signals based on this incoming clock signal for provision to various components of slave device 610.

As further illustrated in FIG. 6, slave device 610 also includes a link control circuit 620. In addition to acting as an interface for the I3C bus, link control circuit 620 may include a read notification controller 622 that may generate one or more read notification messages such as an initial pending read notification message and one or more retransmissions of the pending read notification message (also referred to herein as serial pending read notifications). To generate such messages with particular information, read notification controller 622 may access configuration information in a configuration register 625. Such information may include timing information to indicate an interval at which such serial pending read notifications are sent, along with other parameters for such pending read notifications. Still further, read notification controller 622 may generate the pending read notifications with additional information such as the various hint information as described herein.

With reference now to master device 650, a processing circuit 652 is present, which may send commands and other information to slave device 610 via a driver 656. In turn, processing circuit 652 may receive incoming information from slave device 610 via a receiver 658. As further illustrated, master device 650 also includes a link control circuit 655. In embodiments, link control circuit 655 may perform various operations, including read operations in response to incoming pending read notifications as described herein. With further reference to FIG. 6, master device 650 also includes a clock generator 660 which may generate the clock signal that is sent via a driver 665 to slave device 610. Understand while shown at this high level in the embodiment of FIG. 6, many variations and alternatives are possible.

FIG. 7 depicts a computer-readable storage medium that may be used in conjunction with e.g., the computing device 400, in accordance with various embodiments. Diagram 700 illustrates an example non-transitory computer-readable storage media 702 having instructions configured to practice all or selected ones of the operations associated with the processes described above. As illustrated, non-transitory computer-readable storage medium 702 may include a number of programming instructions 704 (e.g., including slave operation module 418 and master operation module 419). Programming instructions 704 may be configured to enable a device, e.g., computing device 400, in response to execution of the programming instructions, to perform one or more operations of the processes described above such as in reference to FIGS. 1-3. In alternate embodiments, programming instructions 704 may be disposed on multiple non-transitory computer-readable storage media 702 instead. In still other embodiments, programming instructions 704 may be encoded in transitory computer-readable signals.

The following examples pertain to further embodiments.

In one example, an apparatus includes: a first buffer to store data to be transmitted from the apparatus; and a link control circuit coupled to the first buffer to send a pending read notification message to a device coupled to the apparatus via a bus to indicate that the data is available to be read from the first buffer, where if the data has not been read by the device after an identified amount of time, the link control circuit is to send another pending read notification message to the device.

In an example, the identified amount of time is less than an amount of time of a timeout of the device.

In an example, the apparatus further comprises a configuration register to store the identified amount of time.

In an example, the identified amount of time is greater than or equal to 200 microseconds and less than 100 milliseconds, or where the identified amount of time is greater than or equal to a Bus Idle Condition ($t_{IDLE}$), or where the identified amount of time is greater than a value of a retransmission timeout of a slave device.

In an example, the link control circuit is to send the another pending read notification message to the device including altered contents of the pending read notification message to indicate a retransmission.

In an example, the link control circuit is to send the pending read notification message including hint information.

In an example, the hint information comprises an indication of the amount of data to be read.

In an example, the link control circuit is to send the pending read notification message including a tag value to be compared to a tag value in the data, the tag value to be used by the device to determine whether the data has been correctly read.

In an example, the apparatus comprises a slave device to provide capability information to the device to indicate a capability of the slave device to send the pending read notification message, the device comprising a master device.

In an example, the link control circuit is to send an IBI to the device, the IBI comprising the pending read notification message.

In an example, the link control circuit is to send the another pending read notification message to the device after the device has accepted the IBI.

In an example, the link control circuit is to: send the data to the device in response to a private read request from the device; and send the another pending read notification message after the device has accepted the IBI and the apparatus has not received the private read request within the identified amount of time.

In an example, the link control circuit is to send the pending read notification message to the device when the bus is idle.

In another example, a system comprises: a master device coupled to a slave device via a bus. The master device may include: a receiver to receive information from the bus; a first link control circuit coupled to the receiver, where the first link control circuit is to receive, from the slave device, a pending read notification message, determine, based at least in part on the pending read notification message, whether the pending read notification message is a retransmitted pending read notification message, and in response to the retransmitted pending read notification message initiate a private read request to read data from the slave device. The slave device may include: a first buffer to store the data; and a second link control circuit coupled to the first buffer, the second link control circuit to send a pending read notification message to the master device to indicate that the data is available to be read from the first buffer, where if the master device has not read the data after an identified amount of time, the second link control circuit to send the retransmitted pending read notification message to the master device.

In an example, the second link control circuit is to send an IBI to the master device, the IBI comprising the pending read notification message, and where the second link control circuit is to send the retransmitted pending read notification message to the master device after the master device has accepted the IBI.

In an example, the second link control circuit is to: send the data to the master device in response to a private read request from the master device; and send the another pending read notification message after the master device has accepted the IBI and the slave device has not received the private read request within the identified amount of time.

In an example, the slave device is to provide capability information to the master device to indicate a capability of the slave device to send the pending read notification message.

In another example, a method includes: identifying, in a slave device, a pending read notification message to be sent to a master device coupled to the slave device via a bus to indicate that data is available to be read by the master device from a buffer; transmitting the pending read notification message to the master device; and until the data in the buffer has been read by the master device: waiting an identified amount of time, the identified amount of time less than a value of a timeout of the master device; and retransmitting the pending read notification message to the master device.

In an example, the method further comprises includes altering contents of the pending read notification message to indicate a retransmission.

In an example, the method further comprises transmitting an IBI to the master device, the IBI comprising the pending read notification message, and retransmitting the pending read notification message after the master device has accepted the IBI.

In another example, a computer readable medium including instructions is to perform the method of any of the above examples. In another example, a computer readable medium including data is to be used by at least one machine to fabricate at least one integrated circuit to perform the method of any one of the above examples. In another example, an apparatus comprises means for performing the method of any one of the above examples.

Understand that various combinations of the above examples are possible.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

We claim:

1. An apparatus, comprising:
    a first buffer to store data to be transmitted from the apparatus; and
    a link control circuit coupled to the first buffer, the link control circuit to send a pending read notification message to a device coupled to the apparatus via a bus to indicate that the data is available to be read from the first buffer, wherein if the data has not been read by the device after an identified amount of time, the link control circuit is to send another pending read notification message to the device.

2. The apparatus of claim 1, wherein the identified amount of time is less than an amount of time of a timeout of the device.

3. The apparatus of claim 2, further comprising a configuration register to store the identified amount of time.

4. The apparatus of claim 1, wherein the identified amount of time is greater than or equal to 200 microseconds and less than 100 milliseconds, or wherein the identified amount of time is greater than or equal to a Bus Idle Condition ($t_{IDLE}$), or wherein the identified amount of time is greater than a value of a retransmission timeout of a slave device.

5. The apparatus of claim 1, wherein the link control circuit is to send the another pending read notification message to the device including altered contents of the pending read notification message to indicate a retransmission.

6. The apparatus of claim 1, wherein the link control circuit is to send the pending read notification message including hint information.

7. The apparatus of claim 6, wherein the hint information comprises an indication of the amount of data to be read.

8. The apparatus of claim 1, wherein the link control circuit is to send the pending read notification message including a tag value to be compared to a tag value in the data, the tag value to be used by the device to determine whether the data has been correctly read.

9. The apparatus of claim 1, wherein the apparatus comprises a slave device to provide capability information to the device to indicate a capability of the slave device to send the pending read notification message, the device comprising a master device.

10. The apparatus of claim 1, wherein the link control circuit is to send an in-band interrupt (IBI) to the device, the IBI comprising the pending read notification message.

11. The apparatus of claim 10, wherein the link control circuit is to send the another pending read notification message to the device after the device has accepted the IBI.

12. The apparatus of claim 11, wherein the link control circuit is to:
    send the data to the device in response to a private read request from the device; and
    send the another pending read notification message after the device has accepted the IBI and the apparatus has not received the private read request within the identified amount of time.

13. The apparatus of claim 1, wherein the link control circuit is to send the pending read notification message to the device when the bus is idle.

14. The apparatus of claim 1, wherein the apparatus comprises an I3C slave device, and wherein the device comprises an I3C master device.

15. The apparatus of claim 1, further comprising a second buffer to store data to be received in the apparatus.

16. The apparatus of claim 1, wherein the link control circuit is to send a plurality of pending read notification messages until the data has been read by the device.

17. The apparatus of claim 16, wherein the link control circuit is to send the plurality of pending read notification messages according to an interval.

* * * * *

UNITED STATES PATENT AND TRADEMARK OFFICE
CERTIFICATE OF CORRECTION

PATENT NO. : 12,013,806 B2
APPLICATION NO. : 17/128384
DATED : June 18, 2024
INVENTOR(S) : Janusz Jurski et al.

Page 1 of 1

It is certified that error appears in the above-identified patent and that said Letters Patent is hereby corrected as shown below:

In the Claims

Column 14:
Line 45, "13C" should be --I3C--.

Signed and Sealed this
Twenty-fourth Day of December, 2024

Derrick Brent
*Acting Director of the United States Patent and Trademark Office*